Figure 1:
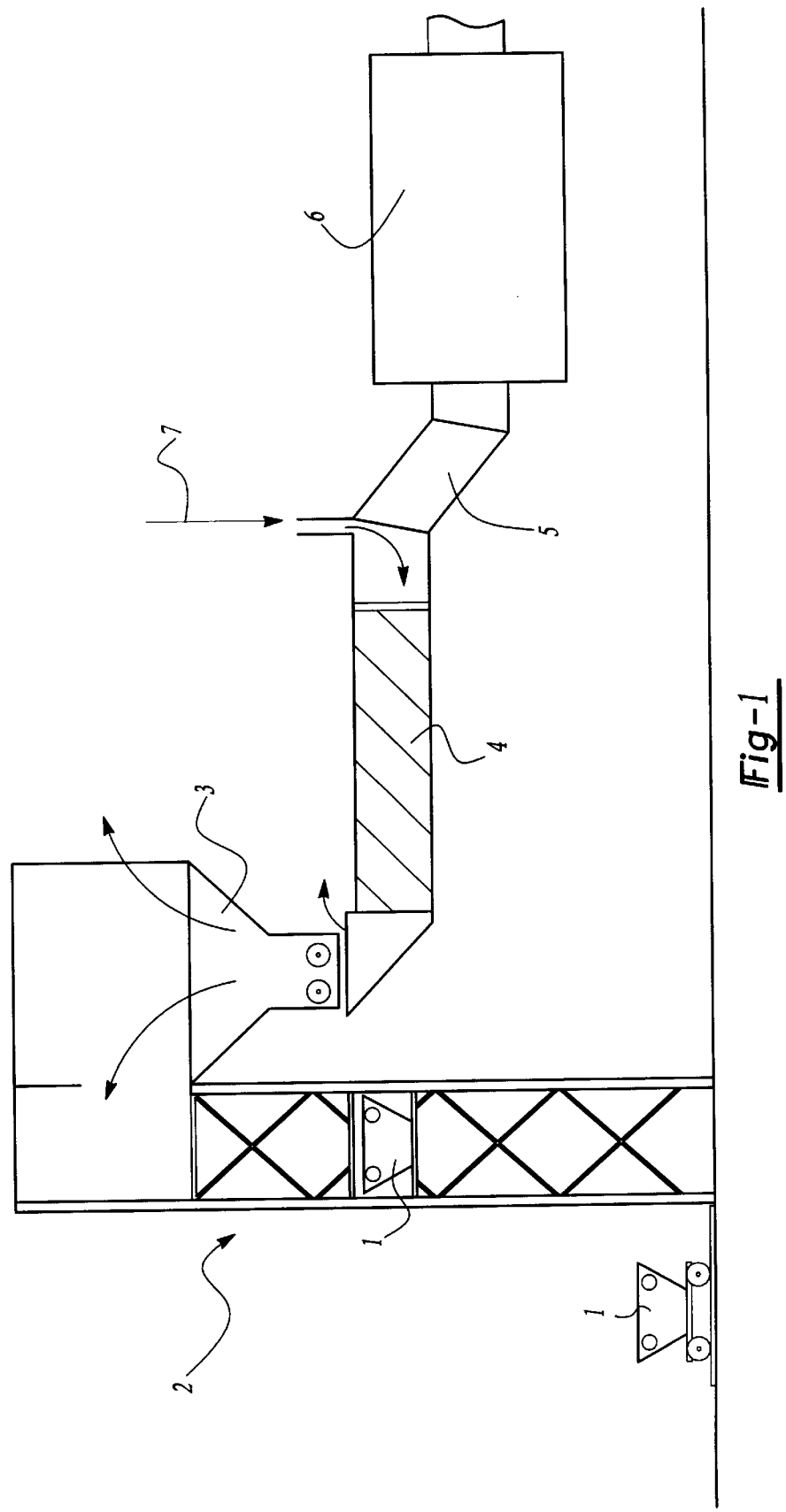

United States Patent [19]
Köhler et al.

[11] Patent Number: 6,125,774
[45] Date of Patent: Oct. 3, 2000

[54] INDUSTRIAL WASTE COMBUSTION PROCESS

[75] Inventors: Kurt Köhler, Weisenheim A. S.; Alfred Bürger, Dülmen; Wilhelm Dinkelborg-Lücke, Nottlun; Heinz Bertich, Limburgerhof; Rolf Hetzelberger, Köln; Paul Kolberg; Karl Heinz Möhlmann, both of Münster; Michael Walterbusch, Ascheberg, all of Germany

[73] Assignee: BASF Coatings AG, Muenster-Hiltrup, Germany

[21] Appl. No.: 09/101,657

[22] PCT Filed: Jan. 24, 1997

[86] PCT No.: PCT/EP97/00322

§ 371 Date: Aug. 26, 1998

§ 102(e) Date: Aug. 26, 1998

[87] PCT Pub. No.: WO97/27429

PCT Pub. Date: Jul. 31, 1997

[30] Foreign Application Priority Data

Jan. 24, 1996 [DE] Germany ............... 196 02 399

[51] Int. Cl.[7] ............... F23G 5/02; F23K 3/00; B02C 17/00; B02C 1/00
[52] U.S. Cl. ............... 110/346; 110/342; 110/341; 110/219; 110/222; 110/226; 110/233; 110/101 R; 241/18; 241/23; 241/27; 241/DIG. 38
[58] Field of Search ............... 110/341, 342, 110/346, 219, 222, 220, 224, 226, 233, 101 R, 108, 109, 110; 241/18, 23, 27, 28, 29, 600, 606, DIG. 14, DIG. 38

[56] References Cited

U.S. PATENT DOCUMENTS

| | | | |
|---|---|---|---|
| 3,734,036 | 5/1973 | Abos | 110/346 |
| 4,133,273 | 1/1979 | Glennon | 110/346 |
| 4,270,470 | 6/1981 | Barnett et al. | 110/346 |
| 4,274,342 | 6/1981 | Nider | 110/346 X |
| 4,658,736 | 4/1987 | Walter | 110/346 X |
| 4,886,000 | 12/1989 | Holter et al. | 110/342 X |
| 5,231,938 | 8/1993 | Gore | 110/346 |
| 5,445,088 | 8/1995 | Daugherty et al. | 110/346 |
| 5,456,024 | 10/1995 | Klausmann et al. | 110/224 X |
| 5,541,386 | 7/1996 | Alvi et al. | 110/346 X |

FOREIGN PATENT DOCUMENTS

| | | |
|---|---|---|
| 2 702 488 | 3/1993 | France . |
| 1 181 316 | 3/1961 | Germany . |
| 2 147 897 | 3/1972 | Germany . |
| 2 245 324 | 4/1974 | Germany . |
| 28 45 763 A1 | 10/1978 | Germany . |
| 36 15 565 C1 | 5/1986 | Germany . |
| 42 05 096 A1 | 8/1993 | Germany ............... 110/342 |
| 1 464 284 A1 | 1/1974 | United Kingdom . |

OTHER PUBLICATIONS

Von Dipl–Ing A. Christmann, Krefeid, "Influence of fuel pretreatment on the process in a refuse Combustion plant", 1985, pp. 213–218, DE Journal Technische Mitteilungen.

Journal No. 5 "Preparation technology", 1962, pp. 211–216.

H. Lehmann, "Primary–side measures for reducing emissions in the termal utilization of waste Materials", Energy appln., & enviromental engineering, Issue 1, Jan. 1994, pp. 16–22.

*Primary Examiner*—Ira S. Lazarus
*Assistant Examiner*—Ljiljana V. Ciric

[57] ABSTRACT

A process for feeding solid industrial and special waste to combustion installations. The waste materials are separated from the combustion chamber by a lock system, are comminuted and homogenized in an inert-gas atmosphere.

26 Claims, 1 Drawing Sheet

INDUSTRIAL WASTE COMBUSTION PROCESS

The invention relates to a combustion process for predominantly solid industrial and special waste.

Thermal disposal of industrial and special waste represents one of the most important processes for the environmentally friendly and, at the same time, cost-effective elimination of problem waste materials. Numerous efforts have therefore been made to develop suitable combustion plants and to further optimize these plants. The main concern with regard to optimization of this nature is to reduce harmful emissions from the plant. Further demands relate to the complete degradation of the pollutants supplied, to achieving combustion residues which are as far as possible reusable and inert, and to the optimum utilization of the thermal energy held in the waste.

An important prerequisite for achieving the abovementioned aims is that combustion of the waste materials be as far as possible uniform and homogeneous. However, this is problematical in particular in the case of predominantly solid waste materials. Such waste materials are often naturally heterogeneous and form regions in the combustion chamber in which certain materials occur with a high concentration. The combustion of these materials can therefore, under certain circumstances, lead to undesirable toxic byproducts. Often, in addition, the waste materials are delivered in packaging containers, such as for example drums, which open up in the combustion chamber and thus require a suddenly high oxygen demand for them to be combusted. Since this oxygen demand as a rule cannot be satisfactorily met, combustion is incomplete, a fact which on the one hand leaves behind unburned residues and on the other hand is responsible for the formation of undesirable byproducts. Therefore, for the combustion of solid waste materials, it is desirable for these materials to be present in a form which is as homogeneous and comminuted as possible, so that they have a large surface area which is readily accessible to oxygen.

The prior art has disclosed various measures for achieving comminution and homogenization of waste materials prior to combustion.

Thus, by way of example, H. Lehmann, in his article "Primärseitige Maβnahmen zur Emissionsminderung bei der thermischen Verwertung von Abfallstoffen [Primary-side measures for reducing emissions in the thermal utilization of waste materials]" ("Energieanwendung, Energie- und Umwelttechnik [Energy application, energy and environmental engineering]", Issue 1, January 1994, pp. 16 ff.) describes, inter alia, a process for the preparation of the material for combustion. This process comprises in particular the comminution to fragment sizes of less than 50 mm. Then, homogeneous mixing with an additive takes place, which additive is intended to bind certain pollutants, such as for example sulfur, chlorine or fluorine. Said process is used for domestic refuse and pollutant-laden activated carbon.

It is also known from Patent Specification DE-B-1,181, 316 to comminute the waste by using mills and screens. The result is a refuse fragment size of from 3 to 6 cm. However, the document mentioned only describes the comminution of domestic refuse.

It is known from DE-A-2,147,897 to employ impact crushers, hammer mills or blade mills to comminute the refuse (bottom of p. 13). A screen which is connected downstream of the mills ensures that the size of the pieces is less than 25 mm (bottom of p. 4). The process described is applied only to domestic refuse.

In the device in accordance with prior art, the waste to be combusted is first sent through a shredder and then conveyed for combustion in a vibrating or worm conveyor. However, this does not provide a homogeneous distribution of the material for burning, so that further measures are required during the combustion. No details are given on the type of refuse which is burnt.

Finally, it is also known from the Journal "Aufbereitungs-Technik [Preparation technology]" (No. May 1962, pp. 211 ff.) firstly to send refuse over a mill, in order to obtain a material which has been comminuted to 0–15 mm. The refuse used in accordance with this process is predominantly domestic refuse, to which there is merely the possibility that some industrial refuse may be added. However, there are no further details about the nature of this industrial refuse.

The literature reference A. Christmann: "Einfluβ einer Brennstoffvorbehandlung auf den Prozeβ einer Müllverbrennungsanlage [Influence of fuel pretreatment on the process in a refuse combustion plant]", DE Journal: Technische Mitteilungen [Technical Information], Volume 78, Issue 5, May 1985, pages 213 to 218, deals with the influence of homogenization. The article relates to the combustion of domestic refuse, to which, if appropriate, clarification sludges may be admixed. In this process, in order to increase the calorific value, the moisture content of the clarification sludge is reduced in steam-heated rotary drums. Furthermore, the waste materials are presorted, with metals in particular being separated out. A high combustion chamber temperature is reached in the combustion process.

To summarize, it can be stated that according to the prior art the comminution of waste materials prior to combustion is known. However, as a rule intimate mixing and homogenization do not take place. In addition, the abovementioned processes can be used virtually exclusively for domestic refuse. The abovementioned processes cannot be used for the combustion of industrial and special waste, as is produced in particular in the coatings industry. With waste materials of this kind, owing to their composition (e.g. fractions of inflammable and readily inflammable liquids), without special counter-measures problems can arise with solids and waste containers breaking open and with the thorough mixing of waste materials of different origins.

These particular problems with the combustion of industrial waste form the subject matter of DE-B-2,245,324. In the process described in that document, the industrial waste is delivered in packing drums. In order to achieve uniform combustion, these packing drums are broken open and their contents are mixed. The document in question proposes three procedures for this purpose:

1. The pretreatment of the waste by deep freezing to the temperature of liquid nitrogen and subsequent comminution of the frozen waste;
2. Pretreatment by evaporating the waste under the exclusion of air;
3. Pretreatment by admixing additives or leaning materials.

Furthermore, in any case the feed of air to the combustion chamber has to be regulated in such a way that it is optimized with regard to volumes of waste supplied and calorific value. The processes mentioned in this document are very expensive and energy-consuming. They are suitable for the situation where the contents of the individual packing drums to be burned are unknown (cf. column 7, line 31 to column 8, line 1; column 8, line 25 to 27). There are no statements relating to the temperatures in the combustion chamber and measures carried out for detoxifying the combustion off-gases. The statutory regulations to be satisfied in 1972, which was the date of the application, have, however, been strengthened in subsequent decades. In particular, the problem of dioxin formation was not yet known at that time. The abovementioned document therefore places the emphasis on avoiding the formation of soot in the stack and avoiding visible black clouds of smoke.

By contrast, the object of the present invention is to provide a process for the combustion of predominantly solid industrial and special waste, this special waste being composed of known waste fractions. The combustion is firstly to take place in such a way that good burnout, uniform combustion and a reduction in harmful emissions, in particular in dioxin emissions, is achieved. Furthermore, it is intended for it to be possible to process different and, under certain circumstances, readily inflammable materials without any safety risks. Said process is to operate in an energy- and cost-intensive manner and is to allow emission limit values to be observed without expensive secondary measures for cleaning the flue gas.

This object is achieved by means of a process which comprises the following steps:

A) Composing a waste batch from the waste materials to be combusted, which contains the following fractions:
  a) 15 to 45, preferably 25 to 37, % by weight of waste from polymer chemistry, preferably distillation residues, coatings and coating components, such as resins and binding agents,
  b) 30 to 80, preferably 40 to 64, % by weight of waste from the production of coatings, preferably coating-contaminated operating means, filter materials or packing drums,
  c) 0 to 10, preferably 1 to 8, % by weight of cellulose residues, preferably paper, cardboard or sawdust,
  c) 5 to 20, preferably 10 to 15, % by weight of sludge, preferably clarification or precipitated sludge,
B) Comminution of the waste batch,
C) Homogenization of the comminuted waste batch, the comminution and homogenization of the waste taking place in an inert-gas atmosphere,
D) Feeding the comminuted and homogenized waste batch to the combustion chamber via a lock system,
E) Combustion of the waste at temperatures of from 700–1000° C., preferably 800–900° C.

Surprisingly, the process according to the invention achieves the objects of the invention. In this process, firstly the process step A) puts together a "combustion menu" from the individual waste fractions whose contents are known, so that a controlled and uniform composition of the fuel is achieved over the duration of the combustion operation. Furthermore, the waste batch put together is comminuted and homogenized. This balances out inhomogeneities in the composition of the waste. Comminution and homogenization take place under an inert gas atmosphere, so that undesirable reactions (fires, formation of explosive gas/air mixtures, etc.) are avoided. In contrast DE-B-2,245,324, there is no need for an energy-intensive deep freezing of the waste to temperatures of liquid nitrogen in order to be able to carry out comminution. However, comminution is an important prerequisite for sufficient homogenization of the waste materials, ensuring that the burn-out is successful. The comminuted and homogenized waste batch is ultimately fed, via a lock system, to the uniformly combustion chamber, this lock system ensuring that the flame of the combustion chamber does not penetrate through to the waste feed. A further essential feature of the process according to the invention is that subsequent combustion takes place at temperatures of from 700–1000° C., preferably from 800–900° C. By contrast, in the prior art very much higher temperatures were customary, typically of 1500° C.

Surprisingly, it has been found that in the process according to the invention statutory emission limit values can be observed even without expensive secondary measures for removing pollutants from the flue gas. The defined, uniform and homogeneous composition of the burnt waste, in particular, as well as the low combustion chamber temperature, contribute to this.

The waste batch which is fed for combustion preferably has a calorific value of from 13–25 MJ/kg, very particularly preferably of 18–19 MJ/kg. The waste fraction from polymer chemistry typically has a calorific value of over 25 MJ/kg, very particularly preferably of 28 to 32 MJ/kg.

The sludge employed which, in particular, may be clarification or precipitated sludge, preferably has a water content of 30–70% by weight, very particularly preferably of 50–60% by weight. The sludge therefore does not have to be dewatered further before it is fed in. The result is a considerable saving on operating and energy expenditure. The sludge, with its high moisture content, has positive effects owing to the fact that it lowers the calorific value of the waste and thus contributes to the desired limitation of the combustion chamber temperature. In addition to the waste fractions listed, the combusted waste may also contain other fractions in the remaining quantity proportions. These may, in particular, be metals, e.g. sheet metals from paint packaging. It is even advantageous for the process according to the invention to admix such metal-containing wastes or to supply them alternately with the waste quantities of the combustion plant which are usually burned. Such an addition of metal-containing waste materials efficiently cleans adhering residues off the comminution and conveying tools.

Preferably, the waste employed is comminuted to fragment sizes of less than 50 mm, very particularly preferably of less than 20 mm. On the one hand, comminution to such a size can be achieved with tolerable expenditure levels, and on the other hand the surface of the material for burning becomes sufficiently large to allow good accessibility to oxygen and hence uniform combustion.

The inert-gas atmosphere may be oxygen-free, but may also contain oxygen up to a maximum content of 8%, preferably 2%. Gases with such a residual content of oxygen are often easier and therefore less expensive to acquire. The process according to the invention thus has the advantage that it is not necessary to avoid feeding in environmental air completely. Nevertheless, there are no safety risks caused by readily flammable waste constituents or by mixing wastes of different origins.

Inert gases which are preferably used comprise burnt-off natural gas, nitrogen, carbon dioxide and/or argon. It is also possible to return flue gas from the end of the combustion plant and to use this as the inert gas.

In the process according to the invention, the comminution is preferably carried out in one or more steps in shredders or breaker mills. It is particularly preferable for the comminution units employed to have different breaking ranges, i.e. different maximum levels for the size and strength of the waste materials supplied, and different output values for the size of the comminution product obtained. Preferably, different shredders and breaker mills of this nature are employed in parallel, so that they can in each case be fed with the waste for which they are optimally suited.

Homogenization of the comminuted waste preferably takes place in a rotary drum, which may in particular be provided with internals.

According to the invention, the comminuted and homogenized waste is kept separate from the combustion chamber by means of a lock system. This is necessary in order to prevent the fire from reaching through to the feed devices. In addition, the lock ensures that the inert gas supplied does not flow through the combustion chamber, but rather travels only through the homogenization and comminution unit. Furthermore, the lock system allows the waste to be fed to the combustion chamber in defined portions.

The process according to the invention also allows important properties of the waste delivered to be recorded and allows this information to be utilized in further treatment of said waste. In this regard, properties include not only the composition of the waste but also mechanical parameters, such as, for example, strength and size of the solids contained or the presence of waste drums. A simple option for recording such properties may, for example, result from analyzing accompanying papers attached by the party sending the waste. The information on mechanical parameters of the waste is interesting in particular if there are parallel comminution devices with different breaking ranges. In this case, it is possible to ensure that the particular refuse container is supplied to precisely that comminution device which is best suited for the waste inside the container. The information on the composition of the waste can be utilized in particular to feed the combustion furnace with as uniform a supply of fuels as possible.

The invention also relates to a feeder device for the combustion process according to the invention, which device comprises at least one comminution device for the waste materials supplied, at least one homogenization unit for the comminuted waste, a lock system for the comminuted and homogenized waste and a feed for inert gas. The lock system is arranged downstream of the homogenization unit and upstream of the combustion chamber. It separates these two areas from one another and, together with the internals in the mixing drum, allows waste to be fed in portions. The feed for the inert gas is preferably arranged between the homogenization unit and the lock system. The inert gas flows through the homogenization unit and then the comminution device. The inert gases used preferably contain 2% of oxygen. It is particularly preferred to use burnt-off natural gas, nitrogen, argon or carbon dioxide.

Furthermore, the device according to the invention may, in its entry region, contain a device for delivering the waste to be combusted. This is preferably a feed system which is used to convey containers. Furthermore, a transfer and supply device for the waste delivered may be present. This may in particular be a crane system and a lifting and tipping device for the containers. It is thus possible to automate the feed of waste.

The comminution device may, in particular, be designed in the form of shredders or breaker mills. If a plurality of such comminution devices are employed, they are preferably arranged in parallel, i.e. the waste delivered passes through precisely one of the various comminution devices. However, it is also possible to arrange a plurality of comminution devices in series, so that the waste passes through these devices in series, thus being comminuted to an ever increasing extent.

A preferred embodiment of the homogenization unit for the comminuted waste comprises a rotary drum with internals. This drum brings about uniform, thorough mixing of the comminuted waste materials, which are simultaneously conveyed onward to the lock system.

Surprisingly, the device according to the invention makes it possible to achieve the aims which were set out as the objects. It is possible to achieve surprisingly good plant efficiency levels when employing further customary combustion devices, such as for example rotary furnaces, postcombustion, waste-heat boilers, cooling and heat exchanger systems and flue gas purification. The result is an excellent burn-off leading to very low residual carbon contents in the fly ash and in the slag. The more uniform combustion leads to the avoidance of emission peaks (carbon monoxide, organic carbon compounds and $NO_x$) . Surprisingly, an installation of this kind also allows the dioxin limit values set down by the 17th German Federal Air Pollution Protection Regulation to be observed without further secondary measures. The device according to the invention allows the combustion of a very wide variety of solids with different comminution performance, since the comminution units employed have a wide operating range, and since when a plurality of comminution units which are connected in parallel are employed it is possible to feed them optimally. In particular, it is possible to dispose of readily flammable substances, such as for example paint or solvent residues contained in drums. Despite such substances being used, and despite the mechanical comminution and intensive mixing of a very wide variety of substances, feeding the inert gas into the critical regions of the installation ensures the safety of the installation. Without such a measure according to the invention, it would not be possible to comminute and homogenize industrial and special wastes for safety reasons.

The device and the process are described by way of example below with reference to the figure.

Industrial and special waste to be combusted is delivered, in the installation according to the figure, via a feed system in containers 1. As a rule, when setting up an installation of this kind a certain type of container is established as the standard. It is possible, by way of example, to use so-called ASP containers. However, special waste may also be delivered in wire boxes.

The containers delivered are then allocated (or the containers are ordered from the works units themselves) on the basis of the contents of the container. It is necessary to ensure in this process that the composition according to the invention of the waste fractions is observed. The batches may be put together and selected by the operating personnel, but may also take place automatically using an electronic data-processing installation. In this case, it is also possible, in particular, to deal with the container contents using automatic data acquisition (e.g. a bar code system). If some of the waste has become deposited on the comminution units or conveying worms, it is possible to feed the combustion with a quantity of waste which contains exclusively or predominantly metals, in which case the metals automatically clean the appliances.

After they have been delivered and sorted out, the containers are taken up by a commercially available crane system and transferred to a lifting and tipping device 2. In the installation on which the example is based, equipment supplied by Otto Dieterle Maschinenbau GmbH & Co., Ascheberg were used. In a lifting and tipping device 2 of this kind, the containers are placed on a lifting platform and anchored fixedly to the device. Then, the entire container is raised to the necessary height and is then emptied by being tipped into the funnel of the comminution unit 3.

In the installation described here, two different comminuters 3 are employed in parallel. One of these comminuters is suitable in particular for especially large solids and is able, for example, to comminute even 220 liter drums. By contrast, the second comminuter can be used to comminute fiber-containing materials (such as for example paper, cardboard, wood, plastic films, so-called big bags). Suitable comminution devices generally use rotating, meshing rotary cutters. Suitable devices are supplied, for example, by Hatlapa GmbH, Uetersen and ARP, Alpirsbach-Peterszell. The material leaving the rotary cutters has a maximum diameter of less than 30 to 40 mm.

The comminuted material then passes into the rotary drum 4. There, it is intimately mixed by means of the constant rotation of the drum and by the action of internals. Therefore, at the end of this rotary drum an extremely homogeneous material for combustion passes into the lock system 5. This lock system separates the region for feeding the waste, which has been described thus far, from the actual combustion region. From the lock 5, the material passes for combustion into the rotary furnace 6, from where it moves through further customary stages of a combustion installation. The lock system 5 itself comprises at least one chamber, which is open on the side facing towards the mixing drum 4, and is closed on the side facing towards the rotary furnace 6. In order to feed the rotary furnace, firstly the side facing towards the mixing drum 4 is closed, and then the outlet to the rotary furnace is opened. In this way, it is ensured that there is never a continuous connection leading from the rotary furnace 6 to the feed unit 3, 4. It is therefore also impossible for any fire to reach the waste materials delivered. The combustion temperatures in the rotary furnace 6 typically lie around 850° C.

In order to avoid explosions, fires or undesirable reactions between the waste materials during the comminution and homogenization operation, inert gas is constantly blown into the installation via a feed 7. The feed 7 is situated upstream of the lock 5, so that the inert gas supplied is forced into the rotary drum 4, since the lock blocks its path into the rotary furnace 6. After having flowed through the mixing drum 4, the inert gas passes into the comminution devices 3 and then leaves the installation. It is also possible to generate reduced pressure in the region of the comminution devices 3, in order to assist the direction of flow of the inert gas. Preferably, burnt-off natural gas is used as the inert gas. Other gases are also suitable, as long as they have an oxygen content of less than 8%, preferably of less than 2%.

What is claimed is:
1. A process for the combustion of predominantly solid industrial and special waste, comprising
   A) providing a waste batch comprising:
      a) 15 to 45% by weight of waste from polymer chemistry,
      b) 30 to 80% by weight of waste from coatings production,
      c) 0 to 10% by weight of cellulose residues,
      d) 5 to 20% by weight of sludge,
   B) comminuting the waste batch in an inert-gas atmosphere to provide a comminuted waste batch,
   C) omogenizing the comminuted waste batch in an inert-gas atmosphere to provide a homogenized waste batch,
   D) feeding the comminuted and homogenized waste batch to a combustion chamber via a lock system, and
   E) combusting the waste at temperatures of 700–1000° C.
2. The process of claim 1, wherein the waste batch fed for combustion has a calorific value of from 13 to 25 MJ/kg.
3. The process of claim 2, wherein the waste batch fed for combustion has a calorific value of from 18–19 MJ/kg.
4. The process of claim 1, wherein the waste from polymer chemistry has a calorific value of over 25 MJ/kg.
5. The process of claim 4, wherein the waste from polymer chemistry has a calorific value of 28 to 32 MJ/kg.
6. The process of claim 1, wherein the sludge has a water content of from 30–70% by weight.
7. The process of claim 6, wherein the sludge has a water content of from 50–60% by weight.
8. The process of claim 1, wherein the waste batch further comprises metals.
9. The process of claim 8, wherein the waste batch comprises sheet metals.
10. The process of claim 8, further comprising alternatively feeding to the combustion chamber waste batches which comprise metal.
11. The process of claim 1, comprising comminuting the waste batch into fragments having sizes of less than 50 mm.
12. The process of claim 11, comprising comminuting the waste batch into fragment having sizes of less than 20 mm.
13. The process of claim 1, wherein the inert gases comprise an oxygen content of 0 to 8% by volume.
14. The process of claim 13, wherein the inert gases comprise an oxygen content of 0 to 2% by volume.
15. The process of claim 1, wherein the inert gases comprise gases selected from the group consisting of burnt-off natural gas, nitrogen, carbon dioxide, argon and mixtures thereof.
16. The process of claim 1, wherein comminuting of the waste batch takes place in one or more shredders or breaker mills.
17. The process of claim 16, wherein comminuting of the waste batch takes place in one or more shredders or breaker mills used in parallel and having different breaking ranges wherein each shredder or breaker mill receives waste suitable for the breaking range of said shredder or mill.
18. The process of claim 1, wherein the homogenizing of the comminuted waste takes place in a rotary drum.
19. The process of claim 18, wherein the homogenizing of the comminuted waste takes place in a rotary drum having internals.
20. The process of claim 1, further comprising recording certain chemical and mechanical parameters relevant to the process, feeding the waste batch as a function of the recorded parameters and optimizing the combustion process as a function of the recorded parameters.

21. The process of claim 1 wherein the waste from polymer chemistry is selected from the group consisting of distillation residues, coatings and coating components, resins, binding agents, and mixtures thereof.

22. The process of claim 1 wherein the waste from production of coatings is selected from the group consisting of waste from coating-contaminated operating means, filter materials, packing drums, and mixtures thereof.

23. The process of claim 1 wherein the waste from cellulose residues is selected from the group consisting of paper, cardboard, sawdust, and mixtures thereof.

24. The process of claim 1 wherein the waste from sludge is selected from the group consisting of clarification sludge, precipitated sludge, and mixtures thereof.

25. A feeder device for the combustion of predominantly solid industrial and special waste, comprising:

a) a delivery device for providing waste to be combusted, b) a transfer and feed device for transferring and feeding waste, c) at least one comminution device for comminuting the transferred waste, d) at least one homogenization unit for homogenizing the comminuted waste, e) a lock system arranged between a combustion chamber and the at least one homogenization unit, said lock system allowing the waste to be fed in portions to the combustion chambers, and f) at least one feed for providing an inert gas to the comminution device and to the homogenization unit.

26. The feeder device of claim 20, further comprising a transverse conveyor for transporting the comminuted waste.

* * * * *